(12) United States Patent
Tamura et al.

(10) Patent No.: US 10,233,835 B2
(45) Date of Patent: Mar. 19, 2019

(54) GASIFICATION POWER PLANT CONTROL DEVICE, GASIFICATION POWER PLANT, AND GASIFICATION POWER PLANT CONTROL METHOD

(71) Applicant: MITSUBISHI HITACHI POWER SYSTEMS, LTD., Kanagawa (JP)

(72) Inventors: Ken Tamura, Tokyo (JP); Takashi Fujii, Tokyo (JP); Takanori Tsutsumi, Tokyo (JP); Takashi Kijima, Niigata (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 641 days.

(21) Appl. No.: 14/786,064

(22) PCT Filed: Apr. 24, 2014

(86) PCT No.: PCT/JP2014/061635
§ 371 (c)(1),
(2) Date: Oct. 21, 2015

(87) PCT Pub. No.: WO2014/175405
PCT Pub. Date: Oct. 30, 2014

(65) Prior Publication Data
US 2016/0069263 A1    Mar. 10, 2016

(30) Foreign Application Priority Data

Apr. 26, 2013    (JP) .................................. 2013-094273

(51) Int. Cl.
*F02C 1/00*    (2006.01)
*F02C 6/18*    (2006.01)
(Continued)

(52) U.S. Cl.
CPC ................. *F02C 6/18* (2013.01); *C10J 3/466* (2013.01); *C10J 3/723* (2013.01); *F02C 3/22* (2013.01);
(Continued)

(58) Field of Classification Search
CPC ........... F01K 23/068; F02C 3/28; Y02E 20/18
See application file for complete search history.

(56) References Cited

U.S. PATENT DOCUMENTS

| 4,442,665 A | 4/1984 | Fick et al. |
| 5,224,336 A | 7/1993 | Agrawal et al. |

(Continued)

FOREIGN PATENT DOCUMENTS

| CN | 1155619 | 7/1997 |
| JP | 2-45010 | 10/1990 |

(Continued)

OTHER PUBLICATIONS

International Search Report dated Aug. 5, 2014 in International Application No. PCT/JP2014/061635.
(Continued)

*Primary Examiner* — Gerald L Sung
(74) *Attorney, Agent, or Firm* — Wenderoth, Lind & Ponack, L.L.P.

(57) ABSTRACT

This IGCC plant is provided with an ASU which separates oxygen gas and nitrogen gas from air, a coal gasification furnace which uses an oxidizing agent to gasify coal, and a gas turbine which is driven by the combustion gas resulting from burning a gas generated by means of the coal gasification furnace. This IGCC plant control device (50) is provided with an air separation amount determination unit (52) which determines the production amount of nitrogen gas produced by the ASU depending on the operating load of the IGCC plant, and supplies to the coal gasification
(Continued)

furnace the entire amount of oxygen gas generated as a byproduct in response to the determined nitrogen gas production amount. By this means, the IGCC plant can minimize blow-off of oxygen gas produced from the air.

9 Claims, 10 Drawing Sheets

(51) Int. Cl.
    *F02C 3/28*     (2006.01)
    *F23N 5/00*     (2006.01)
    *C10J 3/46*     (2006.01)
    *C10J 3/72*     (2006.01)
    *F23L 7/00*     (2006.01)
    *F02C 3/22*     (2006.01)
    *F02C 9/40*     (2006.01)
    *F01K 23/06*     (2006.01)

(52) U.S. Cl.
    CPC ............... *F02C 3/28* (2013.01); *F02C 9/40* (2013.01); *F23L 7/007* (2013.01); *F23N 5/00* (2013.01); *C10J 2300/1653* (2013.01); *C10J 2300/1678* (2013.01); *F01K 23/068* (2013.01); *F05D 2220/72* (2013.01); *Y02E 20/16* (2013.01); *Y02E 20/18* (2013.01); *Y02E 20/344* (2013.01)

(56) References Cited

U.S. PATENT DOCUMENTS

| | | | |
|---|---|---|---|
| 2007/0082306 A1* | 4/2007 | Drnevich | C10J 3/00 431/12 |
| 2007/0151256 A1* | 7/2007 | Kamohara | F02C 3/22 60/781 |
| 2008/0134658 A1* | 6/2008 | Yoshida | F01K 23/068 60/39.12 |
| 2008/0190092 A1* | 8/2008 | Osakabe | F01K 23/067 60/39.12 |
| 2008/0295480 A1* | 12/2008 | Hyakutake | C10J 3/00 60/39.12 |
| 2009/0100822 A1 | 4/2009 | Osakabe et al. | |
| 2010/0058730 A1* | 3/2010 | Sonoda | F01D 21/14 60/39.12 |
| 2010/0229566 A1* | 9/2010 | Takahashi | F01D 5/18 60/772 |
| 2011/0308255 A1* | 12/2011 | Keyser | F01K 23/068 60/772 |
| 2014/0130509 A1* | 5/2014 | Drnevich | F02C 6/18 60/780 |

FOREIGN PATENT DOCUMENTS

| | | |
|---|---|---|
| JP | 5-240577 | 9/1993 |
| JP | 11-22485 | 1/1999 |
| JP | 11-117711 | 4/1999 |
| JP | 2003-148172 | 5/2003 |
| JP | 2003-336081 | 11/2003 |
| JP | 2006-336551 | 12/2006 |
| JP | 2010-91193 | 4/2010 |
| JP | 2010-285564 | 12/2010 |

OTHER PUBLICATIONS

Written Opinion of the International Searching Authority dated Aug. 5, 2014 in International Application No. PCT/JP2014/061635.
Office Action dated Jun. 1, 2016 in Chinese patent application No. 201480022657.6 (with English translation).

* cited by examiner

FIG. 9

| ITEM | OPERATION |
|---|---|
| FUEL GAS AMOUNT OF SLAG MELTING BURNER | |
| OPENING DEGREE OF FLOW CONTROL VALVE a | |
| OPENING DEGREE OF FLOW CONTROL VALVE b | |
| OPENING DEGREE OF FLOW CONTROL VALVE c | |

GASIFICATION POWER PLANT CONTROL DEVICE, GASIFICATION POWER PLANT, AND GASIFICATION POWER PLANT CONTROL METHOD

TECHNICAL FIELD

The present invention relates to a gasification power plant control device, a gasification power plant, and a gasification power plant control method.

BACKGROUND ART

In the related art, for example, in order to increase power generation efficiency of a coal fired power plant, an Integrated Gasification Combined Cycle (IGCC) plant is developed and practically used. The IGCC plant is configured to include a gas turbine which is operated using combustible gas obtained by refining gas, which is obtained by gasifying coal by a gasification furnace, by gas clean-up equipment as a fuel, and a steam turbine which is operated by steam obtained by recovering exhaust heat of the gas turbine.

PTL 1 discloses a coal gasification power plant which gasifies coal using oxygen or oxygen enriched air produced by an oxygen production apparatus which fractions air into nitrogen and oxygen using a difference of boiling points of both, and generates electricity by a gas turbine.

Moreover, as disclosed in PTL 2, there is also an apparatus in which a slag melting burner is installed on a lower portion of a coal gasification furnace. In general, a temperature inside a combustor of a coal gasification furnace is maintained so as to be equal or higher than a melting temperature of ash in coal. However, the ash in the coal may not be temporarily discharged due to an operation state, variation in properties of coal, or the like. In this case, the slag is melted by the slag melting burner installed below a slag discharging port.

CITATION LIST

Patent Literature

[PTL 1] Japanese Unexamined Patent Application Publication No. 11-22485
[PTL 2] Japanese Unexamined Patent Application Publication No. 2010-91193

SUMMARY OF INVENTION

Technical Problem

In an entrained bed gasification furnace in which pulverized coal transported by nitrogen gas is supplied to a coal gasification furnace as a fuel, a supply amount of an oxidizing agent is feedback controlled (concentration of oxygen is constantly controlled) so that the concentration of the oxygen is constant with respect to a Gasifier Input Demand (GID) which is a parameter defining heat input to the gasification furnace (refer to FIG. 12). Moreover, here, the concentration of the oxygen means concentration of oxygen with respect to a total amount of air supplied to the combustor portion of the coal gasification furnace, an oxidizing agent such as oxygen gas and inert gas represented by nitrogen gas for transport or the like.

Particularly, in an air-blown IGCC plant, as air supplied to the coal gasification furnace, air extracted from a compressor included in a gas turbine is pressurized again by an air booster and is used, and oxygen gas, which is generated as a byproduct when nitrogen gas is produced by an air separation unit (ASU), is used. In addition, a flow rate of the oxidizing agent supplied to the coal gasification furnace is controlled as shown in FIG. 13 so as to be increased or decreased by a load correspondence of the coal gasification furnace.

Here, since it is difficult to accurately measure the amount of the nitrogen gas (nitrogen gas for transporting pulverized coal) required when the concentration of the oxygen is calculated, the amount of the nitrogen gas is calculated based on various state amounts. However, the calculated amount of the nitrogen gas also is changed according to variation of the various state amounts. If the concentration of the oxygen in the gas supplied to the gasification furnace is constantly controlled, a command value with respect to the flow rate of the oxidizing agent such as the flow rate of the air or the flow rate of the oxygen also is changed according to vibration of the amount of the nitrogen gas.

Moreover, it is possible to relatively easily adjust the flow rate of the air described above, which is extracted from the gas turbine and pressurized by the air booster again to be used, by adjusting opening and closing of an IGV included in the air booster. Meanwhile, in an air separation unit which uses a low-temperature separation system or the like, since response is slow, considering variation of an oxygen flow rate command value in advance, it is necessary to blow off oxygen and nitrogen all the time and perform the operation.

When discharging properties of the molten slag temporarily deteriorates due to variation in the state amount of the gasification furnace or properties of coal, the slag melting burner is used to heat the slag discharging port to improve the discharging properties.

In an apparatus in which a slag melting burner is installed below the coal gasification furnace, since high temperature is required so as to melt the slag, the oxygen gas produced by the air separation unit is used. In this apparatus, in order to use the slag melting burner in which it is difficult to predict the use time thereof, it is necessary to blow off the oxygen gas having the flow rate required for the slag melting burner all the time, and thus, power consumption of the air separation unit increases.

In addition, considering the above-described control, in order to cope with variation of the consumed side, an operation in which excessive oxygen gas and nitrogen gas are blown off all the time is performed, and thus, power consumption loss occurs.

In addition, when the IGCC plant is operated by a Mega Watt Demand (MWD)), an outlet pressure of the coal gasification furnace is controlled and maintained to set a value, based on the flow rate of the coal or the flow rate of the oxidizing agent associated with the GID. However, there also is great variation in the GID, and thus, the flow rate of the oxygen gas is accordingly changed.

The present invention is made in consideration of the above-described circumstances, and an object of the present invention is to provide a gasification power plant control device, a gasification power plant, and a gasification power plant control method capable of minimizing blow-off of oxygen gas produced from air.

Solution to Problem

In order to solve the above-described problems, a gasification power plant control device, a gasification power plant, and a gasification power plant control method of the present invention adopt the following means.

According to a first aspect of the present invention, there is provided a gasification power plant control device, in which a gasification power plant includes an air separation unit which separates oxygen gas and nitrogen gas from air, a gasification furnace which gasifies a carbon-containing fuel with the oxygen gas as an oxidizing agent, and a gas turbine which is driven by combustion gas resulting from burning combustible gas which is obtained by refining gas generated by the gasification furnace using gas clean-up equipment, the device including: an air separation amount determination unit which determines a production amount of the nitrogen gas produced by the air separation unit depending on an operation load of the gasification power plant, in which the entire amount of oxygen gas generated as a byproduct in response to the production amount of the nitrogen gas determined by the air separation amount determination unit is supplied to the gasification furnace.

According to the present invention, the gasification power plant includes the air separation unit which separates oxygen gas and nitrogen gas from air, the gasification furnace which gasifies the carbon-containing fuel with the oxygen gas as the oxidizing agent, and the gas turbine which is driven by the combustion gas resulting from burning combustible gas which is obtained by refining the gas generated by the gasification furnace using the gas clean-up equipment. For example, the carbon-containing fuel is coal.

The amount of the carbon-containing fuel supplied to the gasification furnace is determined depending on the operation load of the gasification power plant, and nitrogen gas for transporting the determined amount of the carbon-containing fuel is needed. In addition, the oxygen gas is produced from the air by the air separation unit along with the nitrogen gas for transport.

In the related art, the nitrogen gas produced by the air separation unit is excessively produced along with the oxygen gas to correspond to variation of a consumed side. Accordingly, excessive nitrogen gas and oxygen gas are blown off.

Meanwhile, according to the above-described air separation amount determination unit, the production amount of the nitrogen gas produced by the air separation unit is determined according to the operating load of the gasification power plant, and the entire amount of the oxygen gas which is generated as a byproduct according to the production amount of the nitrogen gas is supplied to the gasification furnace.

Accordingly, since the entire amount of the oxygen gas generated as a byproduct is supplied to the gasification furnace without excessively producing the nitrogen gas and the oxygen gas, the present invention can minimize the blow-off of the oxygen gas produced from the air.

In the first aspect, it is preferable that a total amount of the oxidizing agent supplied to the gasification furnace is adjusted by an amount of air extracted from the gas turbine.

According to the present invention, even when the amount of the oxygen gas produced by the air separation unit decreases, the more air is extracted from the gas turbine to the gasification furnace. Accordingly, it is possible to supply oxygen satisfying the amount of the oxygen gas consumed by the gasification furnace to the gasification furnace without controlling the concentration of the oxygen in the gas supplied to the gasification furnace.

In the first aspect, it is preferable that the operation load of the gasification power plant is an output command value with respect to the gasification power plant.

According to the present invention, the production amount of the nitrogen gas is determined based on the output command value with respect to the gasification power plant. Accordingly, the production amount of the oxygen gas is uniquely determined. Since the output command value is a more stable value than a gasifier input demand value which is a parameter defining the heat input to the gasification furnace, the production amounts of the nitrogen gas and the oxygen gas becomes more stable.

In the first aspect, it is preferable that the gasification furnace includes a slag melting burner which melts slag in the gasification furnace, and when the slag melting burner is used, the oxygen gas produced by the air separation unit is more preferentially supplied to the slag melting burner than a burner gasifying the carbon-containing fuel.

According to the present invention, when the slag melting burner is used, since the produced oxygen gas is more preferentially supplied to the slag melting burner than the burner gasifying the carbon-containing fuel, it is not necessary to supply the oxygen gas to the slag melting burner all the time. Alternatively, considering the amount of the oxygen gas used in the slag melting burner, it is not necessary to blow off the oxygen gas all the time.

In the first aspect, it is preferable that the gasification power plant includes an oxidizing agent supply path through which air extracted from an air compressor of the gas turbine or oxygen separated from the air is supplied to the gasification furnace as the oxidizing agent, and when the gasification power plant is in a stationary state, an air ratio fixation mode of fixing an air ratio which is a ratio of the amount of the oxidizing agent supplied to the gasification furnace with respect to a theoretical combustion oxidizing agent amount of the carbon-containing fuel is set, and when an operation state amount of the gasification furnace or a load of the gasification power plant is changed, an air ratio variation mode capable of changing the air ratio is set.

According to the present invention, the gasification power plant includes the gasification furnace which gasifies the carbon-containing fuel using the oxidizing agent, the gas turbine which is driven by the combustion gas resulting from burning combustible gas which is obtained by refining the gas generated by the gasification furnace using the gas clean-up equipment, and the oxidizing agent supply path through which the air extracted from the air compressor of the gas turbine or the oxygen separated from the air is supplied to the gasification furnace as the oxidizing agent. For example, the carbon-containing fuel is coal.

In the related art, when the operation state amount of the gasification furnace is changed or the load of the gasification power plant is changed, in the same manner as the case where the gasification power plant is in the stationary state, the gasification power plant is controlled by the air ratio fixation mode in which the air ratio is fixed. However, since the air ratio is fixed, overshoot occurs in other control amounts (for example, the supply amount of the oxidizing agent) in the gasification furnace, and longer time may be required in order to stabilize the control of the entire gasification power plant. In addition, for example, the operation state amount of the gasification furnace is a heating value of the gas generated by the gasification furnace.

Accordingly, in the present invention, when the operation state amount of the gasification furnace or the load of the gasification power plant is changed, the operation mode is switched from the air ratio fixation mode to the air ratio variation mode in which the air ratio can be changed.

When the operation state amount of the gasification furnace or the load of the gasification power plant is changed, the operation mode is switched to the air ratio variation mode, and the amount of the oxidizing agent is changed according to the load. Accordingly, it is possible to prevent the amount of the oxidizing agent from being overshot. In addition, since the overshoot with respect to the amount of the oxidizing agent is prevented, the amount of the oxidizing agent with respect to the amount of the carbon-containing fuel supplied to the gasification furnace decreases. Accordingly, a production amount of combustible gas (for example, CO) in the gas generated in the gasification furnace increases, and unlike in the related art, the heating value of the generated gas rapidly increases, and the gasification power plant is statically determined in a short time.

Moreover, since the overshoot with respect to the amount of the oxidizing agent is prevented, overshoot tolerance decreases in consideration of capacity in supply equipment of the oxidizing agent. Accordingly, unlike in the related art, it is possible to decrease the capacity of the supply equipment. Moreover, deviation between an equipment design condition of the supply equipment and an operation condition during a normal operation is prevented as the overshoot tolerance decreases.

Therefore, according to the present configuration, it is possible to rapidly stabilize the control of the entire plant without increasing the capacity of the supply equipment of the oxidizing agent.

In the first aspect, the gasification power plant includes an oxidizing agent supply path through which air extracted from an air compressor of the gas turbine or oxygen separated from the air is supplied to the gasification furnace as the oxidizing agent, it is preferable that the gasification power plant is controlled the amount of the oxidizing agent supplied to the gasification furnace within a predetermined upper limit as to allow that an air ratio which is a ratio of the amount of the oxidizing agent supplied to the gasification furnace with respect to a theoretical combustion oxidizing agent amount of the carbon-containing fuel is deviated from a predetermined set value depending on variation of an operation state amount of the gasification furnace or variation of a load of the gasification power plant.

According to the present invention, the gasification power plant includes the gasification furnace which gasifies the carbon-containing fuel using the oxidizing agent, the gas turbine which is driven by the combustion gas resulting from burning the combustible gas which is obtained by refining the gas generated by the gasification furnace using the gas clean up equipment, and the oxidizing agent supply path through which the air extracted from the air compressor of the gas turbine or the oxygen separated from the air is supplied to the gasification furnace as the oxidizing agent. For example, the oxidizing agent is air or oxygen, and for example, the carbon-containing fuel is coal.

In the related art, when the operation state amount of the gasification furnace or the load of the gasification power plant is changed, in order to constantly maintain the operation state of the gasification furnace, an air ratio (a ratio of the amount of the oxidizing agent supplied to the gasification furnace with respect to a theoretical combustion oxidizing agent amount of the carbon-containing fuel in the gasification furnace) is controlled so as to be maintained to a predetermined set value. However, when the air ratio is constantly maintained, overshoot may occur in the other control amounts (for example, the supply amount of the oxidizing agent) in the gasification furnace, and longer time may be required in order to stabilize the control of the entire gasification power plant. In addition, for example, the operation state amount of the gasification furnace is the heating value of the gas generated in the gasification furnace.

Therefore, in the present invention, according to the oxidizing agent amount control means, transitional variation in the operation state of the gasification furnace is allowed according to variation in the operation state amount of the gasification furnace or variation in the load of the gasification power plant, that is, it is allowed that the air ratio is deviated from the predetermined set value, and the amount of the oxidizing agent supplied to the gasification furnace is controlled to be within a predetermined upper limit value. In addition, the upper limit value is determined based on a flow rate of air which can be fed to the gasification furnace by an air compressor. Specifically, the upper limit value is a value in which tolerance is provided to the maximum flow rate of the air compressor. Moreover, for example, the allowable range of the deviation from the predetermined set value is 3% at a relative ratio with respect to the set value, and preferably, is 5%.

Since the upper limit value is positively provided with respect to the control amount of the oxidizing agent supplied to the gasification furnace, overshoot in the amount of the oxidizing agent is prevented. In addition, since the upper limit value is provided, the amount of the oxidizing agent with respect to the amount of the carbon-containing fuel supplied to the gasification furnace decreases. Accordingly, the production amount of the combustible gas (for example, CO) in the gas generated in the gasification furnace increases, and unlike in the related art, the heating value of the generated gas rapidly increases, and the gasification power plant is statically determined in a short time.

Moreover, since the upper limit value is provided, the overshoot in the amount of the oxidizing agent is prevented. Accordingly, overshoot tolerance decreases in consideration of capacity in the supply equipment of the oxidizing agent, and unlike in the related art, it is possible to decrease the capacity of the supply equipment. Moreover, the deviation between the equipment design condition of the supply equipment and the operation condition during the normal operation is prevented as the overshoot tolerance decreases.

As described above, in the present invention, it is allowed that the air ratio is deviated from the predetermined set value, and the upper limit value is provided with respect to the amount of the oxidizing agent supplied to the gasification furnace. Accordingly, it is possible to rapidly stabilize the control of the entire plant without increasing the capacity of the supply equipment of the oxidizing agent.

According to a second aspect of the present invention, there is provided a gasification power plant, including: an air separation unit which separates oxygen gas and nitrogen gas from air; a gasification furnace which gasifies a carbon-containing fuel with the oxygen gas as an oxidizing agent; a gas turbine which is driven by combustion gas resulting from burning combustible gas which is obtained by refining gas generated by the gasification furnace using gas clean-up equipment; and the control device according to the first aspect.

According to a third aspect of the present invention, there is provided a gasification power plant control method, in which a gasification power plant includes an air separation unit which separates oxygen gas and nitrogen gas from air, a gasification furnace which gasifies a carbon-containing fuel with the oxygen gas as an oxidizing agent, and a gas turbine which is driven by combustion gas resulting from burning combustible gas which is obtained by refining gas generated by the gasification furnace using gas clean-up equipment, the method including: a first step of determining a production amount of the nitrogen gas produced by the air separation unit depending on an operation load of the gasification power plant, and a second step of supplying the entire amount of oxygen gas generated as a byproduct in response to the production amount of the nitrogen gas determined by an air separation amount determination unit to the gasification furnace.

Advantageous Effects of Invention

According to the present invention, it is possible to minimize blow-off of oxygen gas produced from air.

BRIEF DESCRIPTION OF DRAWINGS

FIG. 9 is another diagram showing a change of the opening degree of each flow control valve when the slag melting burner according to the embodiment of the present invention is used.

DESCRIPTION OF EMBODIMENTS

Hereinafter, an embodiment of a gasification power plant control device, a gasification power plant, and a gasification power plant control method according to the present invention will be described with reference to the drawings.

In the present embodiments, a case will be described, in which the present invention is adopted to an Integrated Gasification Combined Cycle plant (hereinafter, referred to as an "IGCC plant") which includes a gasification furnace which gasifies a carbon-containing fuel using an oxidizing agent, a gas turbine which is driven by combustion gas generated by burning combustible gas obtained by refining gas generated by the gasification furnace using gas clean-up equipment, and a steam turbine which is driven by steam heated using flue gas of the gasification furnace and the gas turbine. In addition, an example of the oxidizing agent is air and oxygen, and an example of the carbon-containing fuel is coal.

Figure 1:
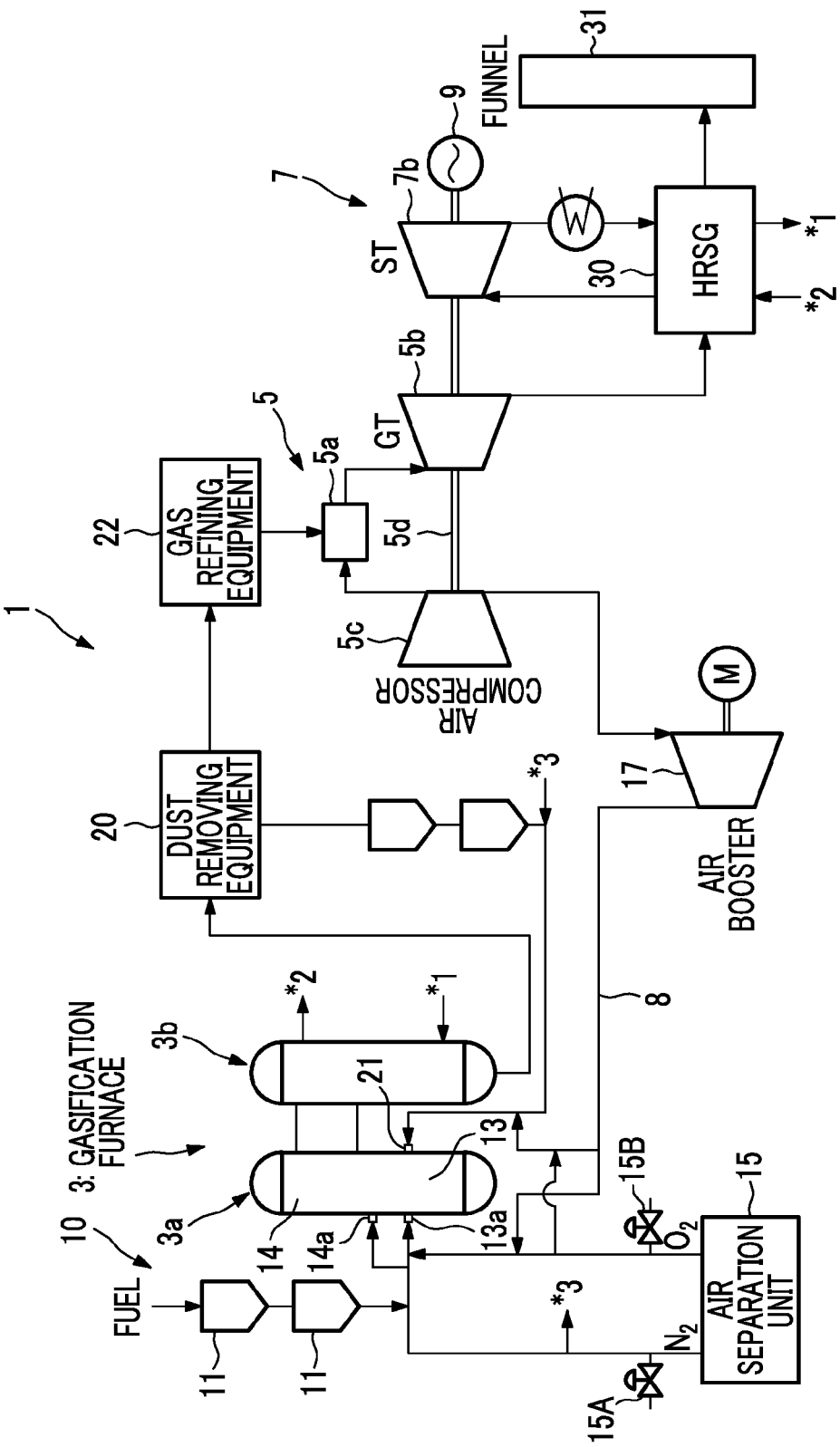
FIG. 1 is a configuration diagram of an IGCC plant according to an embodiment of the present invention.

FIG. 1 is a diagram showing an entire schematic configuration of an IGCC plant 1 according to the present embodiment.

As shown in FIG. 1, the IGCC plant 1 according to the present embodiment mainly includes a coal gasification furnace 3, gas turbine equipment 5, steam turbine equipment 7, and a heat recovery steam generator (hereinafter, referred to as a "HRSG") 30.

Coal supply equipment 10 which supplies pulverized coal to the coal gasification furnace 3 is provided on the upstream side of the coal gasification furnace 3. The coal supply equipment 10 includes a pulverizer (not shown) which grinds coking coal to provide pulverized coal of several μm to several hundreds of μm, and the pulverized coal ground by the pulverizer is stored in a plurality of hopper 11.

The pulverized coal stored in each hopper 11 is transported to the coal gasification furnace 3 by a constant flow rate along with nitrogen gas supplied from an air separation unit (hereinafter, referred to as an "ASU") 15. The ASU 15 is a unit which separates nitrogen gas and oxygen gas from air and supplies the nitrogen gas and the oxygen gas to the coal gasification furnace 3, and valves 15A and 15B for blowing off the nitrogen gas and oxygen gas excessively generated to the outside are provided on a supply line to the coal gasification furnace 3. In addition, as described in detail below, the IGCC plant 1 according to the present embodiment minimize the blow-off without excessively generating the nitrogen gas and the oxygen gas.

The coal gasification furnace 3 includes a coal gasification portion 3a which is formed so that gas flows from the lower portion to the upper portion, and a heat exchanger portion 3b which is connected to the downstream side of the coal gasification portion 3a and is formed so that the gas flows from the upper portion to the lower portion.

A combustor 13 and a reductor 14 are provided on the coal gasification portion 3a in this order from the lower portion. The combustor 13 generates $CO_2$ by burning a portion of the pulverized coal and a char, pyrolyzes the remainders thereof so as to be volatile matter ($CO$, $H_2$, and lower hydrocarbon), and discharges the volatile matter. An entrained bed is adopted in the combustor 13. However, a fluidized bed type or a fixed-bed type may be adopted as the combustor 13.

A combustor burner 13a and a reductor burner 14a are respectively provided in the combustor 13 and the reductor 14, and the pulverized coal is supplied from the coal supply equipment 10 to the combustor burner 13a and the reductor burner 14a.

Air extracted from an air compressor 5c of the gas turbine equipment 5 is supplied to the combustor burner 13a via an air booster 17 and an oxidizing agent supply path 8 along with the oxygen gas separated by the ASU 15, as an oxidizing agent. In this way, air in which concentration of oxygen is adjusted is supplied to the combustor burner 13a. In addition, in the air extracted from the air compressor 5c, oxygen is separated by the ASU 15, and the separated oxygen may be supplied to the combustor burner 13a via the oxidizing agent supply path 8.

In the reductor 14, the pulverized coal is gasified by high-temperature combustion gas from the combustor 13. Accordingly, combustible gas which becomes gas fuel such as CO or $H_2$ is generated from the coal. A coal gasification reaction is an endothermic reaction in which carbon in the pulverized coal and the char reacts with $CO_2$ and $H_2O$ in the high-temperature gas and CO or $H_2$ is generated.

The coal gasification furnace 3 allows air from the air compressor 5c to be supplied to react with the coal and generates gas. Specifically, a plurality of heat exchangers (not shown) are installed in the heat exchanger portion 3b of the coal gasification furnace 3, and the heat exchangers obtain sensible heat from produced gas introduced from the reductor 14 and generate steam. The steam generated in the heat exchangers is mainly used for steam for driving a steam turbine 7b. The produced gas passing through the heat exchanger portion 3b is introduced into dust removal equipment 20. The dust removal equipment 20 includes a porous filter, and the produced gas passes through it. Accordingly, the char including unburned combustibles mixed in the produced gas is captured and recovered. The captured char is deposited on a porous filter, and a char layer is formed. Na or K included in the produced gas is concentrated on the char layer, and as a result, Na or K is removed in the dust removal equipment 20.

The recovered char is returned to a char burner 21 of the coal gasification furnace 3 along with the nitrogen gas supplied from the ASU 15 and is recycled. In addition, Na and K returned to the char burner 21 along with the char is discharged from the lower portion of the coal gasification portion 3a along with ashes of the pulverized coal which has finally been molten. The melted ashes discharged from the coal gasification portion 3a are rapidly cooled with water and crushed, and become a glass-shaped slag.

The produced gas passing through the dust removal equipment 20 is refined by gas clean-up equipment 22, and the refined gas is fed to a combustor 5a of the gas turbine equipment 5 as fuel gas.

The gas turbine equipment 5 includes the combustor 5a by which the fuel gas obtained by refining the produced gas by the gas clean-up equipment 22 is burnt, a gas turbine 5b which is driven by the combustion gas, and the air compressor 5c which feeds high pressure air to the combustor 5a. The gas turbine 5b and the air compressor 5c are connected to each other by a same rotary shaft 5d. The air compressed by the air compressor 5c is extracted and introduced into the air booster 17 separately from the combustor 5a.

Combustion flue gas passing through the gas turbine 5b is introduced into the HRSG 30.

The steam turbine 7b of the steam turbine equipment 7 is a so-called single-shaft type combined system in which the steam turbine 7b is connected to the same rotary shaft 5d as the gas turbine equipment 5. High-pressure steam is supplied from the coal gasification furnace 3 and the HRSG 30 to the steam turbine 7b. In addition, the steam turbine equipment 7 is not limited to the single-shaft type combined system, and may be a dual-shaft type combined system.

A generator 9, to which electricity is output from the rotary shaft 5d driven by the gas turbine 5b and the steam turbine 7b, is disposed on a side opposite to the gas turbine equipment 5 while the steam turbine equipment 7 is interposed therebetween. In addition, the disposition position of the generator 9 is not limited to this position, and may be disposed at any position as long as the generator can obtain electricity output from the rotary shaft 5d.

The HRSG 30 generates steam using the combustion flue gas from the gas turbine 5b, and discharges the combustion flue gas from a funnel 31 to the atmosphere.

Next, an operation of the above-described IGCC plant 1 to which the coal gasification furnace 3 is applied will be described.

After the coking coal is ground by the pulverizer (not shown), the ground coking coal is introduced into the hopper 11 to be stored. The pulverized coal stored in the hopper 11 is supplied to the reductor burner 14a and the combustor burner 13a along with the nitrogen gas which is separated by the ASU 15. In addition, the char recovered by the dust removal equipment 20 is supplied to the char burner 21.

As the combustion gas of the combustor burner 13a, gas is used in which oxygen gas separated by the ASU 15 is added to compressed air which is extracted from the air compressor 5c of the gas turbine equipment 5 and is further boosted by the air booster 17. In the combustor 13, the pulverized coal and the char are partially burnt by the combustion air, $CO_2$ is generated, and the remainders thereof are pyrolyzed to be volatile matter (CO, $H_2$, and lower hydrocarbon).

In the reductor 14, the pulverized coal supplied from the reductor burner 14a and the char in which the volatile matter are discharged in the combustor 13 are gasified by high-temperature gas moved upward from the combustor 13, and combustible gas such as CO or $H_2$ is generated.

The produced gas passing through the reductor 14 provides sensible heat to each heat exchanger while passing through the heat exchanger portion 3b of the coal gasification furnace 3, and generates steam. The steam generated by the heat exchanger portion 3b is mainly used for driving the steam turbine 7b.

The produced gas passing through the heat exchanger portion 3b is introduced into the dust removal equipment 20, and the char is recovered. Na and K in the produced gas are concentrated in the dust removal equipment 20 and are incorporated in the char. The char including the recovered Na and K is returned to the coal gasification furnace 3.

After the produced gas passing through the dust removal equipment 20 is refined by the gas clean-up equipment 22, the refined gas is introduced into the combustor 5a of the gas turbine equipment 5 and is burnt along with the compressed air supplied from the air compressor 5c. The gas turbine 5b is rotated by the combustion gas, and the rotary shaft 5d is driven.

The combustion flue gas passing through the gas turbine 5b is introduced into the HRSG 30, and steam is generated using the sensible heat of the combustion flue gas. The steam generated in the HRSG 30 is mainly used for driving the steam turbine 7b.

The steam turbine 7b is rotated by the steam from the coal gasification furnace 3 and the steam from the HRSG 30 and drives the same rotary shaft 5d as the gas turbine equipment 5. A rotating force of the rotary shaft 5d is converted into electricity output by the generator 9.

Figure 2:
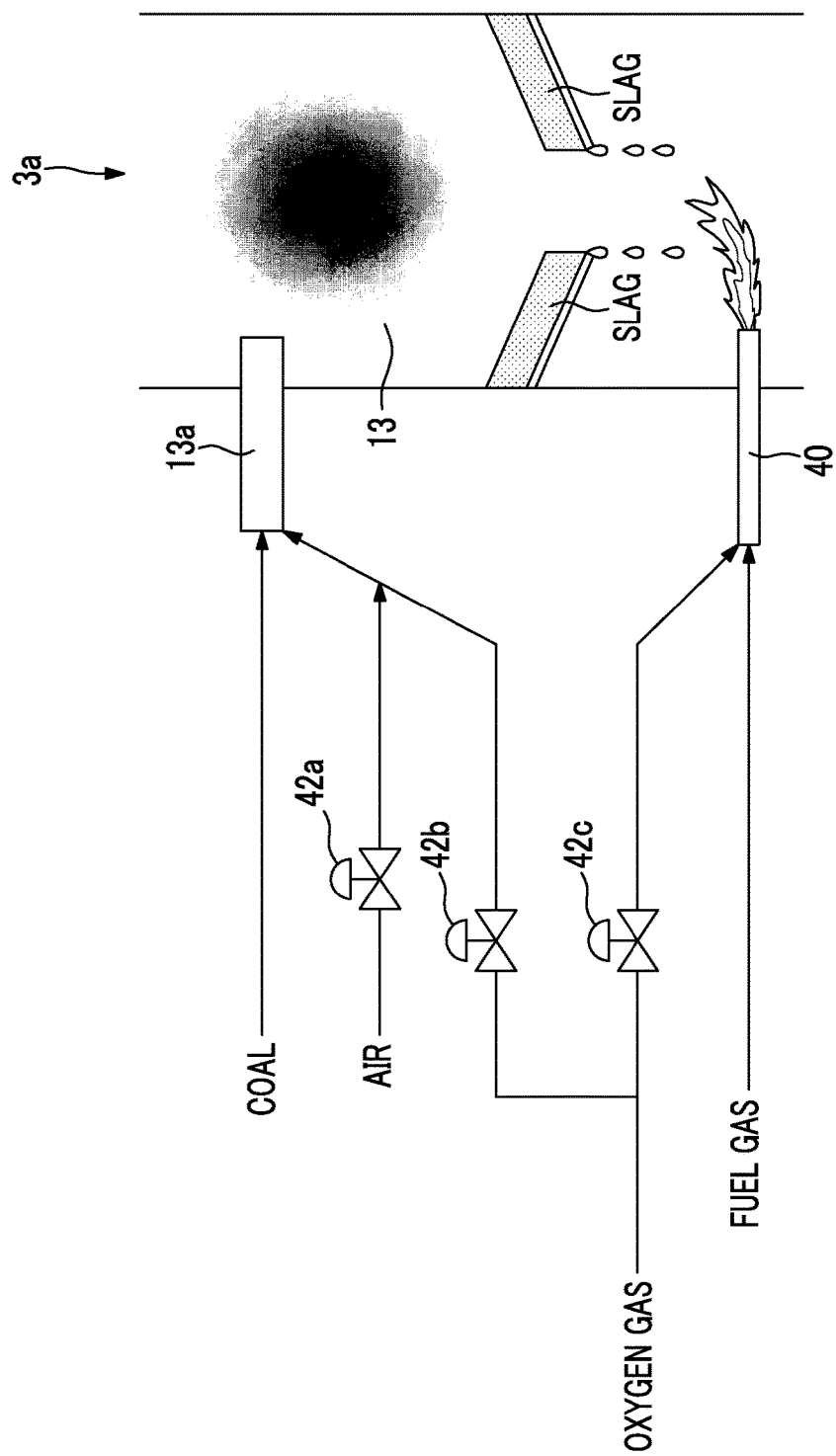
FIG. 2 is a diagram showing a path of gas supplied to a slag melting burner included in a coal gasification furnace according to the embodiment of the present invention.

FIG. 2 is a diagram showing a path of the gas supplied to a slag melting burner 40 included in the coal gasification furnace 3. FIG. 2 shows not only the path of the gas supplied to the slag melting burner 40 but also the path of the gas supplied to the combustor burner 13a.

As shown in FIG. 2, the coal from the coal supply equipment 10, the air from the air booster 17, and the oxygen gas produced by the ASU 15 are supplied to the combustor burner 13a. In addition, the oxygen gas produced by the ASU 15 is supplied to the slag melting burner 40 along with the fuel gas.

A flow control valve 42a is provided in a supply line of the air to the combustor burner 13a, a flow control valve 42b is provided in a supply line of the oxygen gas to the combustor burner 13a, and a flow control valve 42c is provided in a supply line of the oxygen gas to the slag melting burner 40.

In addition, a flow control valve similar to the flow control valve 42a is provided in a supply line of the air to the char burner 21, and a flow control valve similar to the flow control valve 42b is also provided in a supply line of the oxygen gas to the char burner 21.

Figure 3:
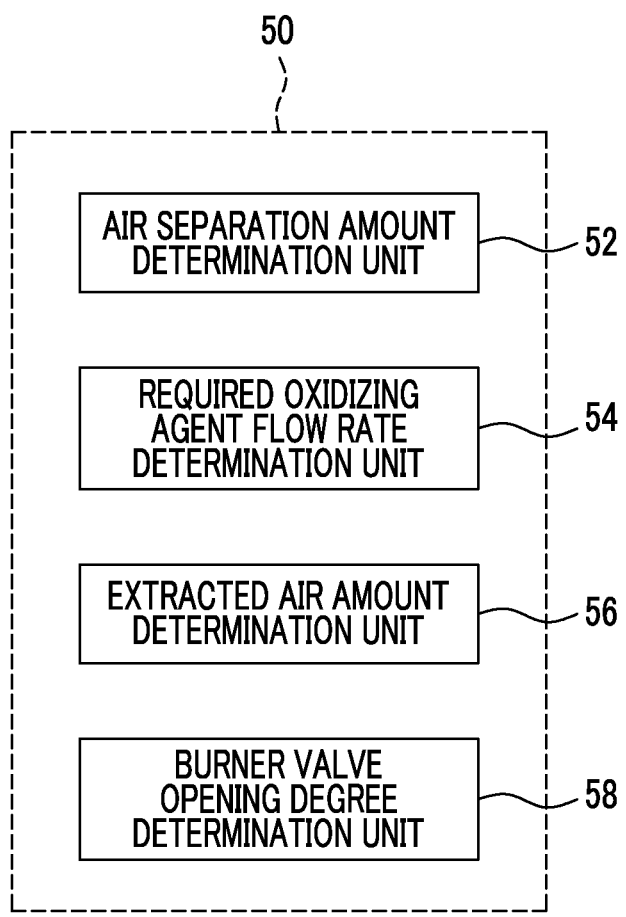
FIG. 3 is a functional block diagram showing a control with respect to gas supplied to the coal gasification furnace in an IGCC plant control device according to the embodiment of the present invention.

FIG. 3 is a block diagram showing a function of a control device 50 which controls the IGCC plant 1. In addition, FIG. 3 shows a function related to a control with respect to gas supplied to the coal gasification furnace 3.

For example, the control device 50 is configured of a Central Processing Unit (CPU), a Random Access Memory (RAM), a computer readable recording medium, or the like. In addition, for example, a series of processing for realizing various functions of an air separation amount determination unit 52, a required oxidizing agent flow rate determination unit 54, an extracted air amount determination unit 56, and a burner valve opening degree determination unit 58 described below is recorded in a recording medium or the like in a program format, the CPU reads the programs through the RAM or the like, and the various functions are realized by performing processing of information and calculation processing.

The air separation amount determination unit 52 determines the production amount (flow rate) of the nitrogen gas separated by the ASU 15, according to an operation load of the IGCC plant 1. In addition, the air separation amount determination unit 52 also uniquely determines the production amount (flow rate) of the oxygen gas separated by the ASU 15, according to the production amount of the nitrogen gas.

The required oxidizing agent flow rate determination unit 54 determines a flow rate of the oxidizing agent (hereinafter, referred to as a "required oxidizing agent flow rate") which is needed by the coal gasification furnace 3 according to the operation load of the IGCC plant 1.

The extracted air amount determination unit 56 calculates the flow rate of the air satisfying the required amount of the oxygen gas, based on a difference between the production amount of the oxygen gas separated by the ASU 15 and the amount of the required oxygen, that is, shortage of the required oxidizing agent flow rate, and determines the amount of the air extracted from the air compressor 5c included in the gas turbine equipment 5 to the coal gasification furnace 3. That is, a total amount of the oxidizing agent supplied to the coal gasification furnace 3 is adjusted by the amount of the air extracted from the gas turbine equipment 5.

The burner valve opening degree determination unit 58 determines the opening degrees of the flow control valves (flow control valves 42a, 42b, 42c, or the like) provided in the supply lines of the gas to the various burners.

Figure 4:
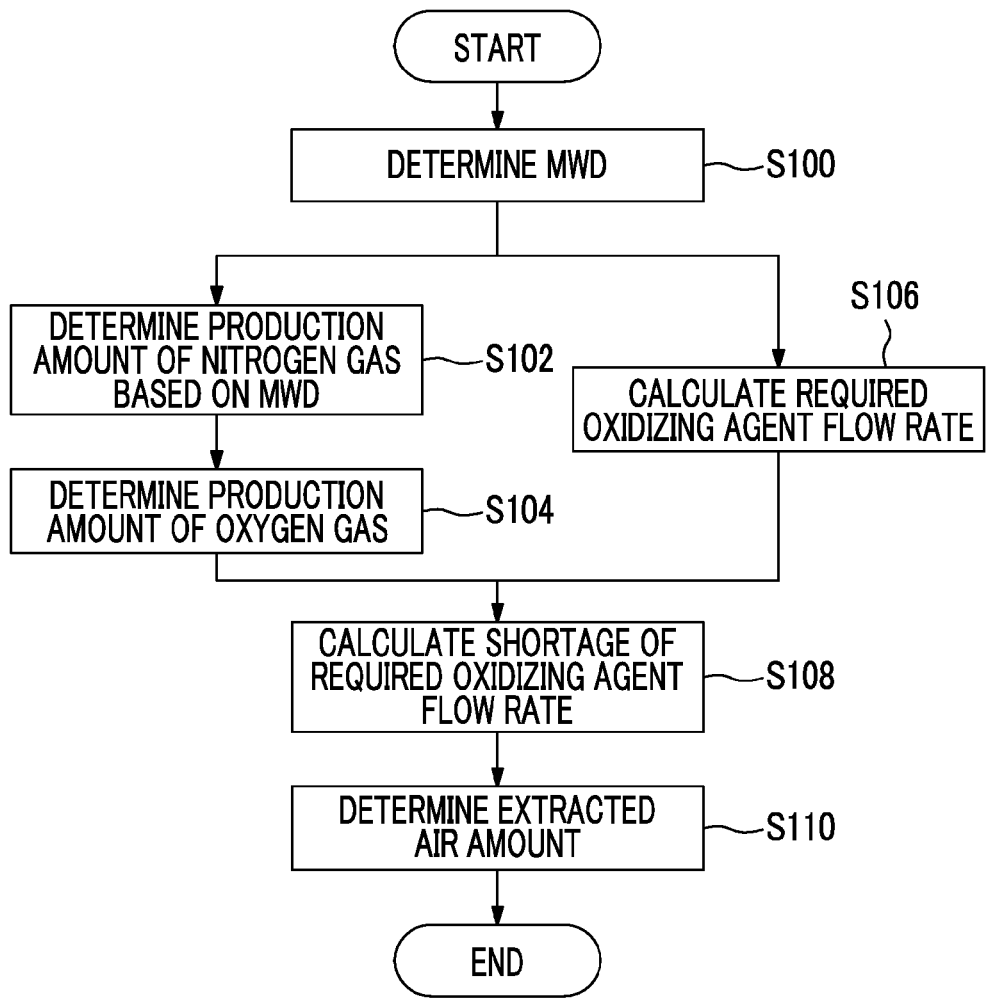
FIG. 4 is a flow chart showing a flow with respect to determination processing of an oxygen amount according to the embodiment of the present invention.

FIG. 4 is a flow chart showing a flow of processing (hereinafter, referred to as "determination processing of oxygen amount") related to determination of the oxygen amount performed by the control device 50.

First, in Step 100, an output command (a Mega Watt Demand in the present embodiment, and hereinafter, referred to as a "MWD") with respect to the IGCC plant 1 is determined as an index indicating the operation load of the IGCC plant 1.

Here, in addition to the MWD, as the index indicating the operating load of the IGCC plant 1, for example, there is a Gasifier Input Demand (hereinafter, referred to as a "GID") which is a parameter which defines the heat input to the coal gasification furnace 3. Since the MWD indicates a more stable value than the GID, the production amounts of the nitrogen gas and the oxygen gas separated by the ASU 15 are more stable.

In the subsequent Step 102, the production amount of the nitrogen gas separated by the ASU 15 is determined based on the determined MWD.

Figure 5:
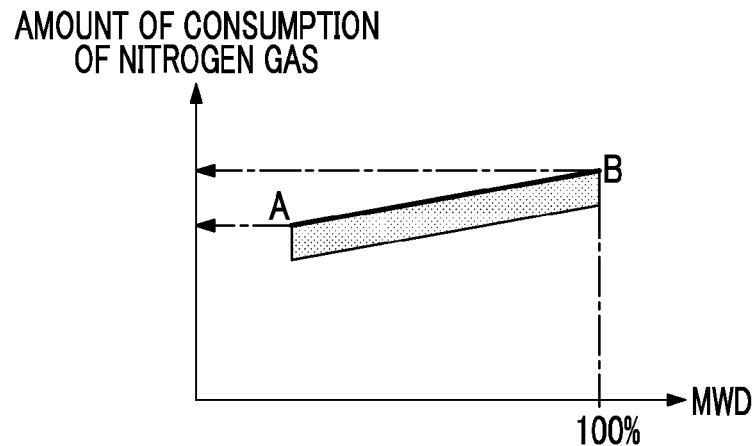
FIG. 5 is a graph showing a relationship between a MWD and an amount of nitrogen gas consumption according to the embodiment of the present invention.

FIG. 5 is a graph showing a relationship between the MWD and an amount of consumption of the nitrogen gas. The amount of consumption of the nitrogen gas for transporting the coal and the char to the gasification furnace 13 is transitionally changed and has a width shown in FIG. 5. Accordingly, in Step 104, the maximum value of the width is determined as the production amount of the nitrogen gas separated by the ASU 15. In addition, the production amount of the nitrogen gas increases as the MWD increases.

In the subsequent Step 104, the production amount of the oxygen gas is determined.

Figure 6:
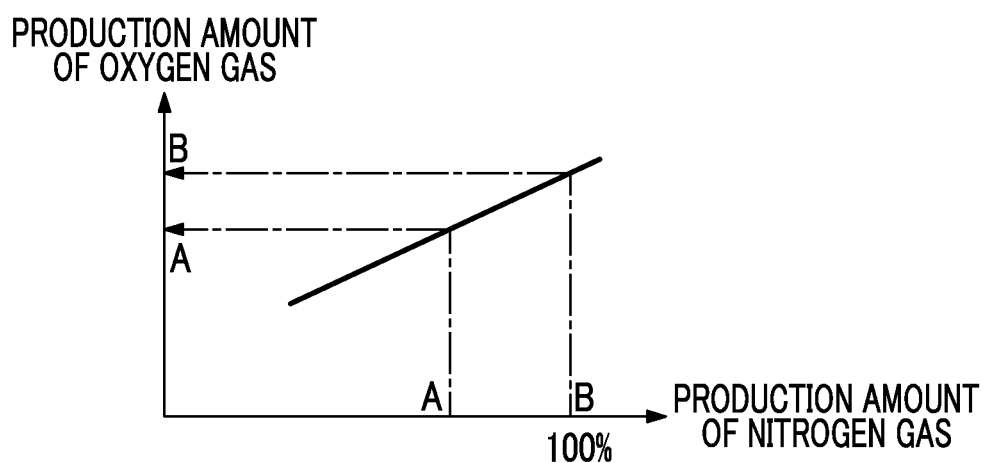
FIG. 6 is a graph showing a relationship between a production amount of nitrogen gas and a production amount of oxygen gas according to the embodiment of the present invention.

FIG. 6 is a graph showing a relationship between the production amount of the nitrogen gas and the production amount of the oxygen gas. As shown in FIG. 6, the production amount of the oxygen gas is uniquely determined by characteristics of the ASU 15 according to the production amount of the nitrogen gas.

Figure 7:
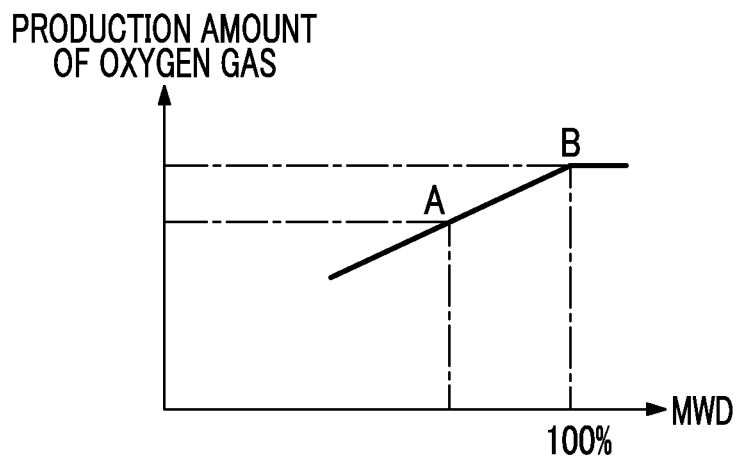
FIG. 7 is a graph showing a relationship between the production amount of the oxygen gas and the MWD according to the embodiment of the present invention.

FIG. 7 is a graph showing a relationship between the MWD and the production amount of the oxygen gas. As shown in FIG. 7, the production amount of the oxygen gas is set as a function with respect to the MWD. The control device 50 can easily determine the production amount of the oxygen gas using the set function.

In addition, the processing of Steps 102 and 104 corresponds to the function of the air separation amount determination unit 52.

Moreover, in Step 106 subsequent to Step 100, the required oxidizing agent flow rate is calculated based on the MWD. Step 106 is performed in parallel with Steps 102 and 104.

In addition, the processing of Step 106 corresponds to the function of the required oxidizing agent flow rate determination unit 54.

In Step 108 subsequent to the Steps 104 and 106, the shortage of the required oxidizing agent flow rate is calculated. The IGCC plant 1 according to the present embodiment supplies the entire amount of the produced oxygen gas to the gasification furnace 3. However, since the entire required oxidizing agent flow rate is not satisfied by the produced oxygen gas, the shortage of the required oxidizing agent flow rate is calculated.

In the subsequent Step 110, the amount of the air extracted from the air compressor 5c to the coal gasification furnace 3 is determined based on the shortage of the required oxidizing agent flow rate.

Accordingly, the air ratio control of the coal gasification furnace 3 is adjusted by the air extracted from the gas turbine 5b, and concentration of the oxygen is not controlled.

In addition, the processing of Steps 108 and 110 corresponds to the function of the extracted air amount determination unit 56.

In this way, the control device 50 operates the ASU 15 based on the MWD, supplies the entire amount of the produced oxygen gas and nitrogen gas to the coal gasification furnace 3, and supplies the air from the air compressor 5c to the coal gasification furnace 3 based on the calculated amount of the extracted air.

Accordingly, since the IGCC plant 1 can supply the entire amount of the produced oxygen gas to the coal gasification furnace 3 without excessively producing the oxygen gas along with the nitrogen gas, it is possible to minimize the blow-off of the oxygen gas produced from the air.

Next, controls of the opening degrees of the flow control valves 42a, 42b, and 42c when the slag melting burner 40 is used will be described.

In the IGCC plant 1 of the present embodiment, when the slag melting burner 40 is used, the produced oxygen gas is more preferentially supplied to the slag melting burner 40 than the combustor burner 13a and the char burner 21. Accordingly, it is not necessary for the IGCC plant 1 to supply the oxygen gas to the slag melting burner 40 all the time. Alternatively, considering the amount of the oxygen gas used in the slag melting burner 40, it is not necessary to blow off the oxygen gas all the time.

Figure 8:
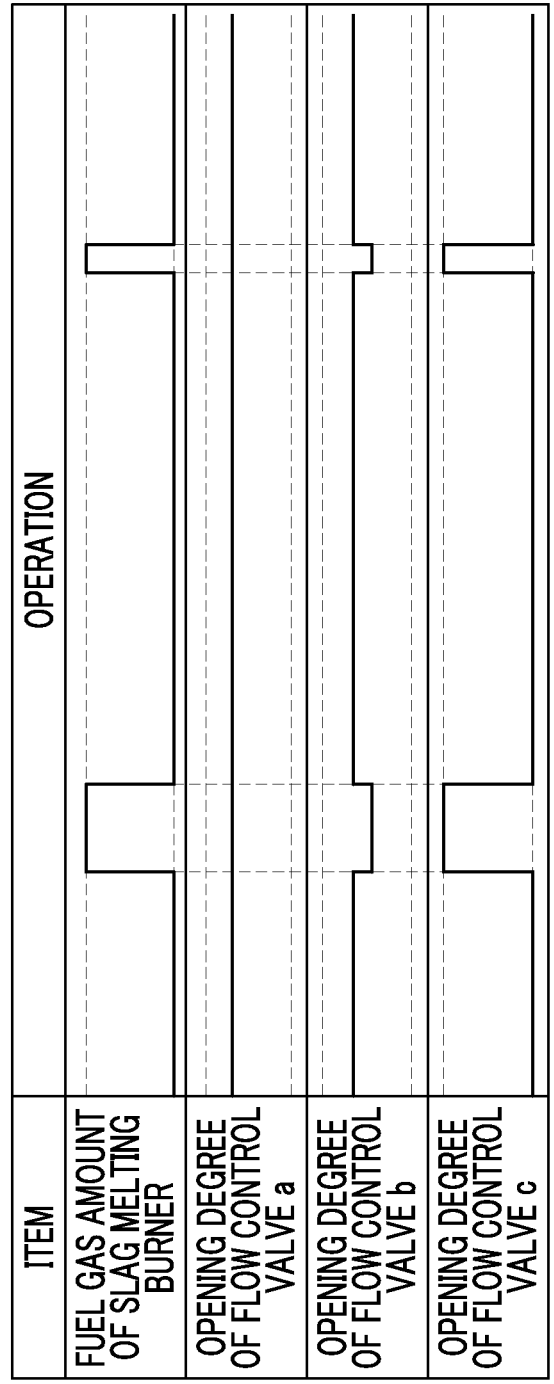
FIG. 8 is a diagram showing a change of an opening degree of each flow control valve when the slag melting burner according to the embodiment of the present invention is used.

FIG. 8 is a diagram showing changes of the opening degrees of the flow control valves 42a, 42b, and 42c when the slag melting burner 40 is used.

When the slag melting burner 40 is used, the fuel gas is supplied to the slag melting burner 40, the flow control valve 42c is open, and the oxygen gas produced by the ASU 15 is supplied to the slag melting burner 40.

In this case, the flow control valve 42b which adjusts the flow rate of the oxygen gas flowing to the combustor burner 13a is throttled according to the flow rate of the oxygen gas flowing through the flow control valve 42c. Meanwhile, the opening degree of the flow control valve 42a which adjusts the flow rate of the air flowing to the combustor burner 13a is not changed. That is, the flow rate of the oxidizing agent flowing to the combustor burner 13a temporarily decreases.

FIG. 9 is a diagram showing other aspects in the changes of the opening degrees of the flow control valves 42a, 42b, and 42c when the slag melting burner 40 is used.

In the aspects shown in FIG. 9, when the slag melting burner 40 is used, the flow control valve 42a is open to compensate the amount of the oxygen gas which is decreased by throttling the flow control valve 42b. Accordingly, the amount of the oxygen included in the oxidizing agent supplied to the combustor burner 13a is maintained.

As described above, the IGCC plant 1 according to the present embodiment includes the ASU 15 which separates oxygen gas and nitrogen gas from air, the coal gasification furnace 3 which gasifies the coal using the oxidizing agent, and the gas turbine 5b which is driven by the combustion gas resulting from burning the fuel gas which is obtained by refining the gas generated by the coal gasification furnace 3 using the gas clean-up equipment 22. The control device 50 of the IGCC plant 1 includes the air separation amount determination unit 52 which determines the production amount of the nitrogen gas produced by the ASU 15 according to the operating load of the IGCC plant 1, and supplies the entire amount of the oxygen gas which is generated as a byproduct according to the determined production amount of the nitrogen gas to the coal gasification furnace 3.

Accordingly, the IGCC plant 1 can minimizes the blow-off of the oxygen gas produced from the air.

Modification Example 1

In addition to the control of the embodiment, the control device 50 may set the operation mode of the IGCC plant 1 to an air ratio fixation mode in which the air ratio is fixed when the IGCC plant 1 is in a stationary state, and to an air ratio variation mode in which the air ratio can be changed when an operation state amount of the coal gasification furnace 3 or a load of the IGCC plant 1 is changed. In addition, the air ratio indicates a ratio of the flow rate of the oxidizing agent supplied to the coal gasification furnace 3 with respect to a theoretical combustion oxidizing agent flow rate of the carbon-containing fuel.

In the related art, when the operation state amount of the coal gasification furnace 3 is changed (refer to FIG. 10) or when the load of the IGCC plant 1 is changed (refer to FIG. 11), in the same manner when the IGCC plant 1 is in the stationary state, the IGCC plant 1 is controlled by the air ratio fixation mode in which the air ratio is fixed. In other words, the control in which the air ratio is fixed means that the air ratio is controlled so as to be constantly maintained. However, since the air ratio is fixed, overshoot occurs in other control amounts (for example, the flow rate of the oxidizing agent) in the coal gasification furnace 3, and in order to stabilize the control of the entire IGCC plant 1, time may be required.

Accordingly, when the operation state amount of the coal gasification furnace 3 is changed or the load of the IGCC plant 1 is changed, the control device 50 switches the operation mode from the air ratio fixation mode to the air ratio variation mode in which the air ratio can be changed.

When the operation state amount of the coal gasification furnace 3 or the load of the IGCC plant 1 is changed, the operation mode is switched to the air ratio variation mode, and the flow rate of the oxidizing agent is changed according to the load. Accordingly, it is possible to prevent the flow rate of the oxidizing agent from being overshot. In addition, since the overshoot with respect to the flow rate of the oxidizing agent is prevented, the flow rate of the oxidizing agent with respect to the amount of the carbon-containing fuel supplied to the coal gasification furnace 3 decreases. Accordingly, the production amount of the combustible gas (for example, CO) in the gas generated in the gasification furnace 3 increases, and unlike in the related art, the heating value of the generated gas rapidly increases, and the IGCC plant 1 is statically determined in a short time.

Moreover, since the overshoot with respect to the flow rate of the oxidizing agent is prevented, overshoot tolerance decreases in consideration of the capacity of the air booster 17 which is the supply equipment of the oxidizing agent. Accordingly, unlike in the related art, it is possible to decrease the capacity of the air booster 17. In addition, deviation between an equipment design condition of the air booster 17 and an operation condition during a normal operation is prevented as the overshoot tolerance decreases.

Therefore, in the IGCC plant 1, it is possible to rapidly stabilize the control of the entire plant without increasing the capacity of the air booster 17.

Here, the reason why the operation state amount of the coal gasification furnace 3 is changed, in order words, the reason why hunting occurs in the power output of the IGCC plant 1 is as follows.

Figure 10:
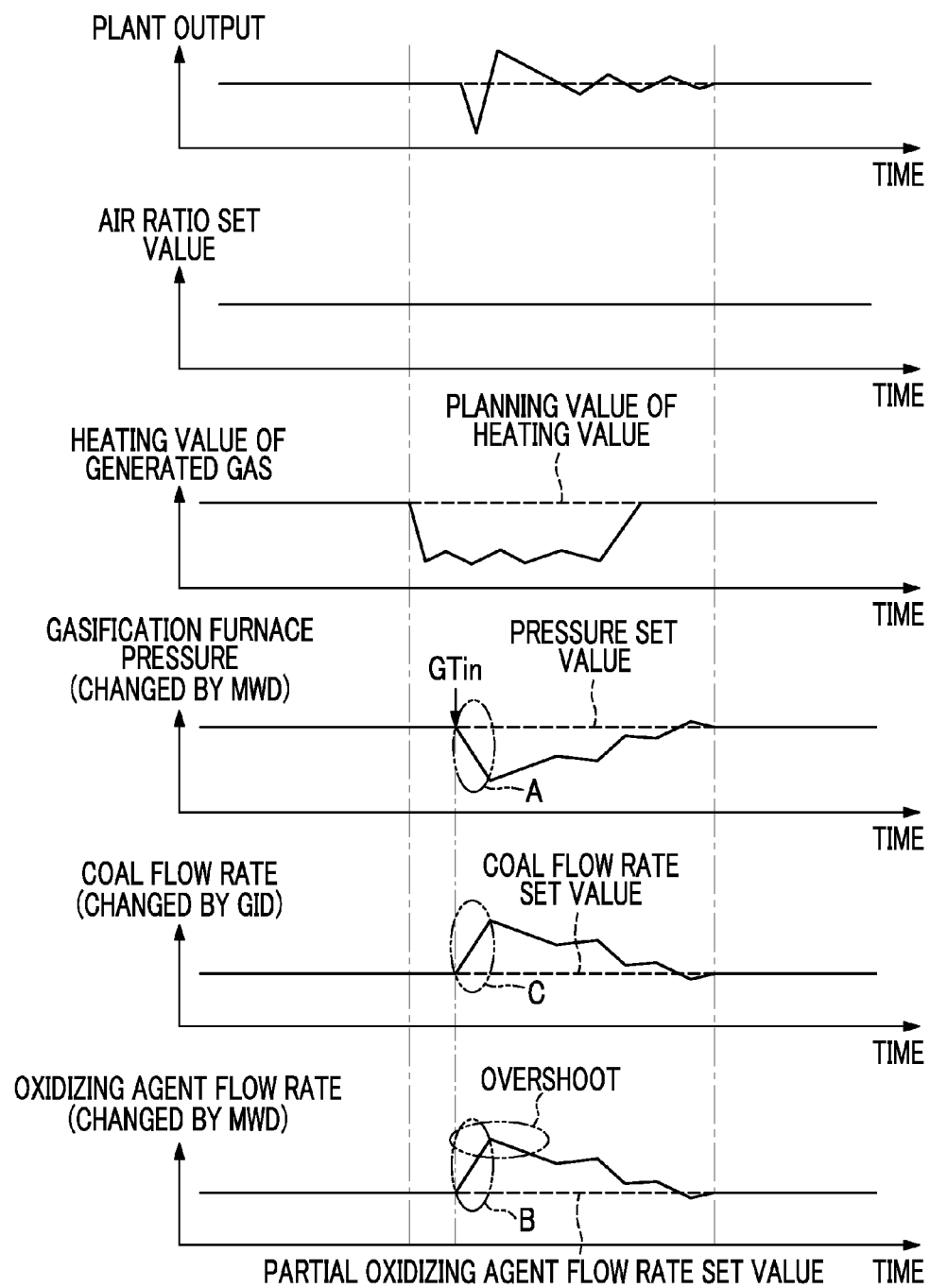
FIG. 10 is a graph showing a change over time of various state amounts according to variation of an operation state amount of the coal gasification furnace according to a modification example of the present invention.

If the amount of the fuel supplied to the gas turbine 5b increases, as shown by A region indicating a change of a gasification furnace pressure over time in FIG. 10, deviation between an actual gasification furnace pressure (measurement value) and the set value of the gasification furnace pressure increases. According to this, as shown by B region indicating the change of the flow rate of the oxidizing agent over time in FIG. 10, the amount of the air extracted from the air compressor 5c of the gas turbine 5b increases, and the power output of the IGCC plant 1 decreases.

That is, it is considered that the reason why the operation state amount of the coal gasification furnace 3 is changed is because the deviation between the measurement value of the gasification furnace pressure and the set value of the gasification furnace pressure increases. In addition, when the IGCC plant 1 is statically determined, the deviation between the measurement value of the gasification furnace pressure and the set value of the gasification furnace pressure is 0 or decreases.

Therefore, when the deviation between the measurement value of the gasification furnace pressure and the set value of the gasification furnace pressure is greater than that when the IGCC plant 1 is statically determined, the control device 50 determines that the load of the IGCC plant 1 is changed, and the operation mode is set to the air ratio variation mode.

Moreover, as the IGCC plant 1, there is a plant in which the driving shaft of the steam turbine equipment 7 is not coaxial with the driving shaft of the gas turbine 5b. In the IGCC plant 1, the case where the load of the IGCC plant 1 is changed is set to a case where the output of the gas turbine 5b does not increase and the GID increases. If the GID increases, the flow rate of the coal increases as shown by a region C indicating the change of the flow rate of the coal over time in FIG. 10.

As described above, when the GID increases while the output of the gas turbine 5b does not increase, the control device 50 of the IGCC plant 1 determines that the load of the IGCC plant 1 is changed and sets the operation mode to the air ratio variation mode.

Modification Example 2

In addition to the control of the above-described embodiment, the control device 50 allows that the air ratio is deviated from a predetermined set value according to the variation of the operation state amount of the coal gasification furnace 3 or the variation of the load of the IGCC plant 1, and controls the flow rate of the oxidizing agent supplied to the coal gasification furnace 3 to be within the a predetermined upper limit value.

In the related art, when the operation state amount of the coal gasification furnace 3 is changed or the load of the IGCC plant 1 is changed, in order to constantly maintain the operation state of the coal gasification furnace 3, the air ratio is controlled so as to be maintained to the predetermined set value. However, when the air ratio is constantly maintained, overshoot may occur in the other control amounts (for example, the flow amount of the oxidizing agent) in the coal gasification furnace 3, and in order to stabilize the control of the entire IGCC plant 1, time may be required.

Figure 11:
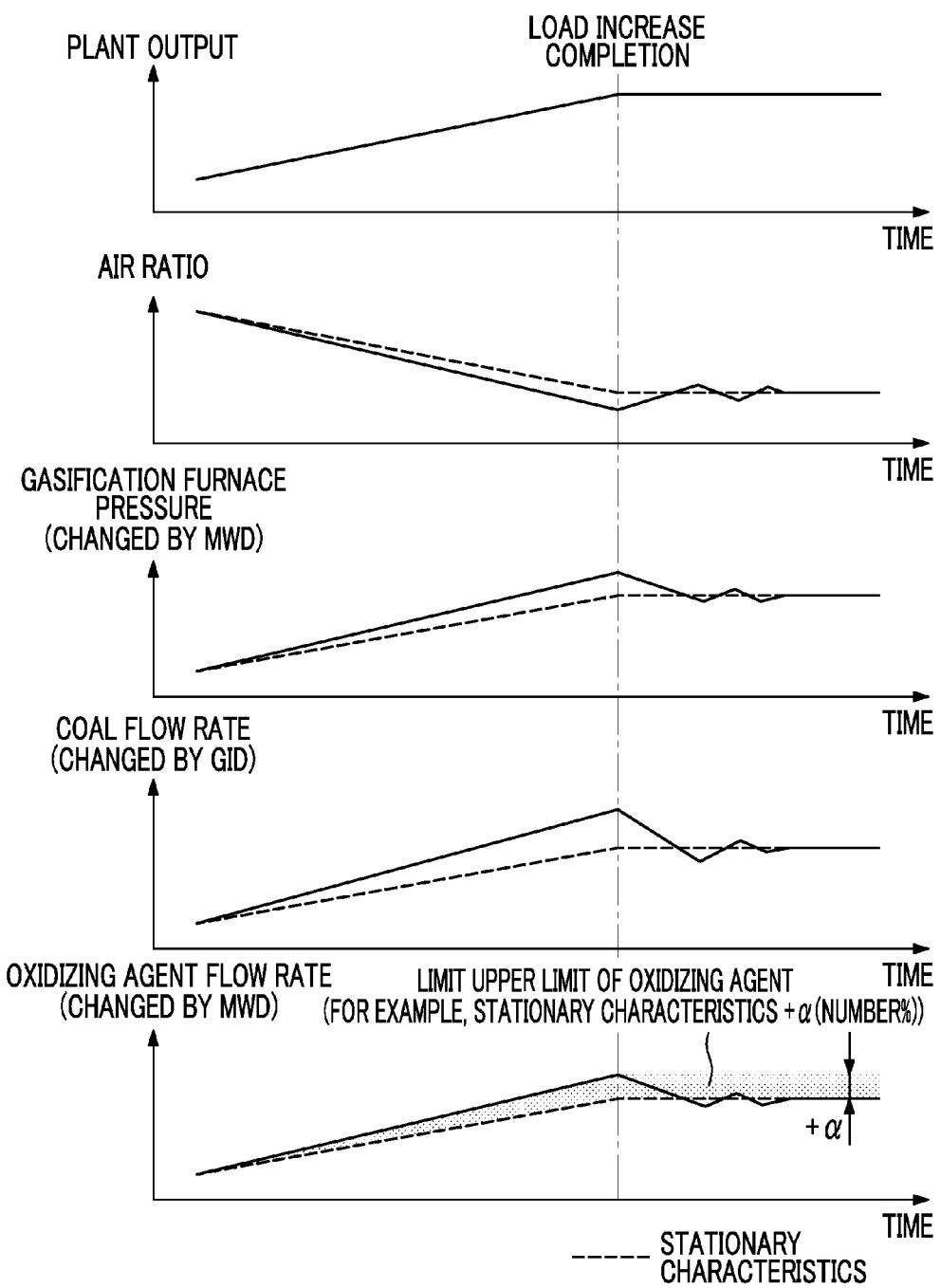
FIG. 11 is a graph showing a change over time of various state amounts according to variation of a load of the IGCC plant according to the modification example of the present invention.
Figure 12:
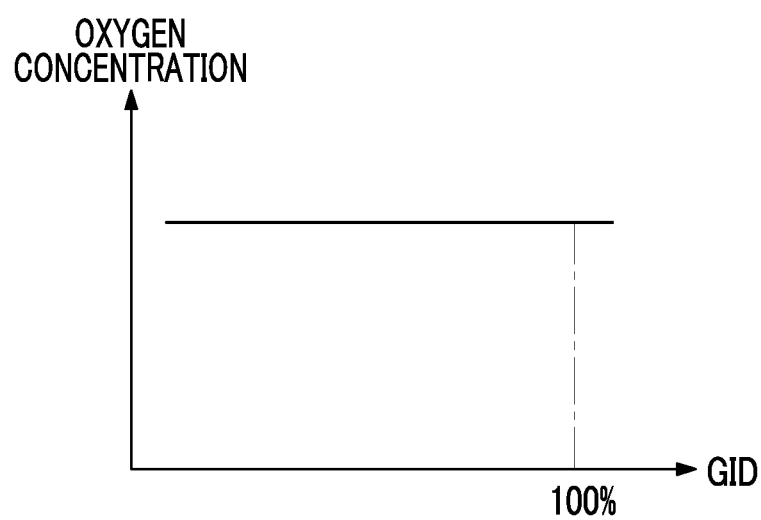
FIG. 12 is a graph showing a relationship between a GID and oxygen concentration in a coal gasification furnace of the related art.
Figure 13:
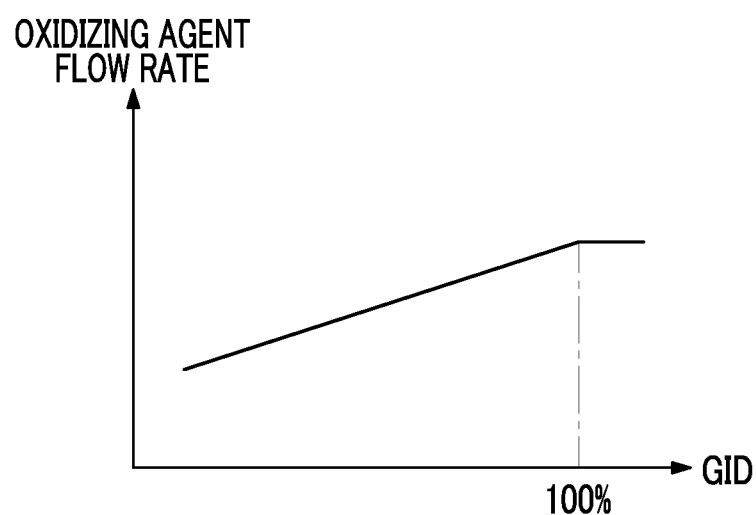
FIG. 13 is a graph showing a relationship between the GID and a flow rate of an oxidizing agent in the coal gasification furnace of the related art.

Therefore, the control device 50 allows transitional variation in the operation state of the coal gasification furnace 3 according to the variation in the operation state amount of the coal gasification furnace 3 or the variation in the load of the IGCC plant 1, that is, allows that the air ratio is deviated from the predetermined set value, and controls the flow rate of the oxidizing agent supplied to the coal gasification furnace 3 to be within a predetermined upper limit value (refer to change over time of the flow rate of the oxidizing agent in FIGS. 10 and 11). In addition, the upper limit value is determined based on the flow rate of the air which can be fed to the coal gasification furnace 3 by the air compressor 5c. Specifically, the upper limit value is a value in which tolerance is provided to the maximum flow rate of the air compressor 5c. Moreover, for example, the allowable range of the deviation from the predetermined set value is 3% at a relative ratio with respect to the set value, preferably, is 5%.

Since the upper limit value is positively provided with respect to the control amount of the flow rate of the oxidizing agent supplied to the coal gasification furnace 3, overshoot in the flow rate of the oxidizing agent is prevented. In addition, since the upper limit value is provided, the flow rate of the oxidizing agent with respect to the amount of the carbon-containing fuel supplied to the coal gasification furnace 3 decreases. Accordingly, the production amount of the combustible gas (for example, CO) in the gas generated in the coal gasification furnace 3 increases, and unlike in the related art, the heating value of the generated gas rapidly increases, and the IGCC plant 1 is statically determined in a short time.

Moreover, since the upper limit value is provided, the overshoot in the flow rate of the oxidizing agent is prevented. Accordingly, overshoot tolerance decreases in consideration of capacity in the air booster 17, and unlike in the related art, it is possible to decrease the capacity of the air booster 17. In addition, the deviation between the equipment design condition of the air booster 17 and the operation condition during the normal operation is prevented as the overshoot tolerance decreases.

As described above, the control device 50 allows that the air ratio is deviated from the predetermined set value, and the upper limit value is provided with respect to the flow rate of the oxidizing agent supplied to the coal gasification furnace 3. Accordingly, it is possible to rapidly stabilize the control of the entire plant without increasing the capacity of the air booster 17.

Hereinbefore, the present invention is described with reference to the embodiment. However, the technical scope of the present invention is not limited to the range described in the embodiment. Various modifications and improvement can be applied to the embodiment within a scope which does not depart from the gist of the present invention, and the modifications and improvement also are included the technical scope of the present invention.

In addition, in the embodiment, as the gasification power plant according to the present invention, the IGCC plant 1 including the steam turbine equipment 7 is described. However, the present invention is not limited to this, and for example, may be applied to a gasification power plant which does not include the steam turbine equipment.

Moreover, in each embodiment, the aspect is described in which the entire amount of the oxygen gas generated as a byproduct according to the production amount of the nitrogen gas produced by the ASU 15 is supplied to the coal gasification furnace 3. However, the present invention is not limited to this, and may adopt an aspect in which approximately the entire amount of the oxygen gas generated as a byproduct according to the production amount of the nitrogen gas is supplied to the coal gasification furnace 3.

In addition, approximately in approximately the entire amount means that leakage of the oxygen gas in the supply line of the oxygen gas or the like is allowed.

Moreover, in each embodiment, the aspect is described in which the amount of the extracted air is determined from the required oxidizing agent flow rate calculated based on the MWD. However, the present invention is not limited to this, and may adopt an aspect in which the amount of the extracted air with respect to each MWD is determined in advance, and the amount of the extracted air is determined based on the MWD.

In addition, in each embodiment, the aspect is described in which the presence or absence of the variation in the operation state amount of the coal gasification furnace 3 is determined based on the deviation between the measurement value and the set value of the gasification furnace pressure. However, the present invention is not limited to this, and may adopt an aspect in which the presence or absence thereof is determined based on the deviation between the measurement value and the set value of the outlet pressure of the coal gasification furnace 3, the deviation between the measurement value and the set value of the outlet pressure of the gas clean-up equipment 22, or the deviation between the measurement value and the set value of the inlet pressure of the gas turbine 5b.

| Reference Signs List | |
| --- | --- |
| 1: | IGCC PLANT |
| 3: | COAL GASIFICATION FURNACE |
| 5b: | GAS TURBINE |
| 15: | ASU |
| 22: | GAS CLEAN-UP EQUIPMENT |
| 40: | SLAG MELTING BURNER |
| 50: | CONTROL DEVICE |
| 52: | AIR SEPARATION AMOUNT DETERMINATION UNIT |

The invention claimed is:

1. A gasification power plant control device for controlling a gasification power plant that includes an air separation unit that separates oxygen gas and nitrogen gas from air, a gasification furnace that gasifies a carbon-containing fuel with the oxygen gas as an oxidizing agent, and a gas turbine that is driven by combustion gas resulting from burning fuel gas obtained by refining gas generated by the gasification furnace using gas clean-up equipment, the gasification power plant control device comprising:
an air separation amount determination unit which determines a production amount of the nitrogen gas produced by the air separation unit and supplied to the gasification furnace depending on an operation load of the gasification power plant,
wherein an entire amount of oxygen gas generated as a byproduct in response to the production amount of the nitrogen gas determined by the air separation amount determination unit is supplied to the gasification furnace.

2. The gasification power plant control device according to claim 1, the control device further comprising a required oxidizing agent flow rate determination unit, and an extracted air amount determination unit,
wherein a total amount of the oxidizing agent to be supplied to the gasification furnace is adjusted by an amount of air extracted from the gas turbine.

3. A gasification power plant, comprising:
an air separation unit which separates oxygen gas and nitrogen gas from air;
a gasification furnace which gasifies a carbon-containing fuel with the oxygen gas as an oxidizing agent;
a gas turbine which is driven by combustion gas resulting from burning fuel gas which is obtained by refining gas generated by the gasification furnace using gas clean-up equipment; and
a gasification power plant control device including an air separation amount determination unit which determines a production amount of the nitrogen gas produced by the air separation unit and supplied to the gasification furnace depending on an operation load of the gasification power plant,
wherein the entire amount of oxygen gas generated as a byproduct in response to the production amount of the nitrogen gas determined by the air separation amount determination unit is supplied to the gasification furnace.

4. The gasification power plant according to claim 3, wherein the control device further comprises a required oxidizing agent flow rate determination unit, and an extracted air amount determination unit,
wherein a total amount of the oxidizing agent supplied to the gasification furnace can be adjusted by an amount of air extracted from the gas turbine.

5. The gasification power plant according to claim 3, wherein the operation load of the gasification power plant is an output command value with respect to the gasification power plant.

6. The gasification power plant according to claim 3, wherein the gasification furnace includes a slag melting burner which melts slag in the gasification furnace, and
wherein when the slag melting burner is used, the oxygen gas produced by the air separation unit is supplied to the slag melting burner, and the oxygen gas supplied to the burner gasifying the carbon-containing fuel is adjusted by a burner valve opening degree determination unit.

7. The gasification power plant according to claim 3, wherein the gasification power plant includes an oxidizing agent supply path through which air extracted from an air compressor of the gas turbine or oxygen separated from the air is supplied to the gasification furnace as the oxidizing agent, and
wherein when the gasification power plant is in a stationary state, an air ratio fixation mode of fixing an air ratio which is a ratio of the amount of the oxidizing agent supplied to the gasification furnace with respect to a theoretical combustion oxidizing agent amount of the carbon-containing fuel is set, and when an operation state amount of the gasification furnace or a load of the gasification power plant is changed, an air ratio variation mode capable of changing the air ratio is set.

8. The gasification power plant according to claim 3, wherein the gasification power plant includes an oxidizing agent supply path through which air extracted from an air compressor of the gas turbine or oxygen separated from the air is supplied to the gasification furnace as the oxidizing agent, and
wherein it is allowed that an air ratio which is a ratio of the amount of the oxidizing agent supplied to the gasification furnace with respect to a theoretical combustion oxidizing agent amount of the carbon-containing fuel is deviated from a predetermined set value depending on variation of an operation state amount of the gasification furnace or variation of a load of the gasification power plant, and the amount of the oxidizing agent supplied to the gasification furnace is controlled to be within a predetermined upper limit.

9. A gasification power plant control method, in which a gasification power plant includes an air separation unit which separates oxygen gas and nitrogen gas from air, a gasification furnace which gasifies a carbon-containing fuel with the oxygen gas as an oxidizing agent, and a gas turbine which is driven by combustion gas resulting from burning fuel gas which is obtained by refining gas generated by the gasification furnace using gas clean-up equipment, the method comprising:

a first step of determining a production amount of the nitrogen gas produced by the air separation unit and supplied to the gasification furnace depending on an operation load of the gasification power plant, the production amount of the nitrogen gas being determined by an air separation amount determination unit; and a second step of supplying an entire amount of oxygen gas, generated as a byproduct in response to production of the nitrogen gas, to the gasification furnace.

* * * * *